United States Patent
Motoyama

(10) Patent No.: US 7,903,136 B2
(45) Date of Patent: Mar. 8, 2011

(54) SCANNING OPTICAL APPARATUS AND IMAGE FORMING APPARATUS

(75) Inventor: Hajime Motoyama, Moriya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/175,988

(22) Filed: Jul. 18, 2008

(65) Prior Publication Data

US 2009/0021570 A1  Jan. 22, 2009

(30) Foreign Application Priority Data

Jul. 18, 2007  (JP) .................................. 2007-187603

(51) Int. Cl.
*B41J 2/45* (2006.01)
(52) U.S. Cl. ....................................................... 347/238
(58) Field of Classification Search .................. 347/240, 347/251, 233, 234, 254, 238, 248
See application file for complete search history.

(56) References Cited

U.S. PATENT DOCUMENTS

| 4,435,064 A * | 3/1984 | Tsukada et al. ................... 355/1 |
| 5,848,087 A * | 12/1998 | Iwasa et al. ................. 372/50.23 |
| 2008/0278566 A1 * | 11/2008 | Towner et al. ................. 347/243 |
| 2009/0244252 A1 * | 10/2009 | Kleckner et al. .............. 347/233 |

FOREIGN PATENT DOCUMENTS

| JP | 09054262 A | * | 2/1997 |
| JP | 2002086792 A | * | 3/2002 |
| JP | 2005231327 A | * | 9/2005 |
| JP | 2006-116716 A | | 5/2006 |

* cited by examiner

*Primary Examiner* — Hai C Pham
(74) *Attorney, Agent, or Firm* — Rossi, Kimms & McDowell LLP

(57) ABSTRACT

A scanning optical apparatus uses a light source pair that includes at least two light sources to scan a same scan line. The scanning optical apparatus includes: a first group of light sources which include a first light source of a light source pair and are lined up on a first line; and a second group of light sources which include a second light source of the light source pair and are lined up on a second line. The first line and the second line are inclined with respect to reference lines corresponding to scan lines so that the first light source and the second light source of the light source pair scan the same scan line. Moreover, a distance between the first light source and the second light source of the light source pair is at least twice a distance between two adjacent light sources in the first line.

10 Claims, 16 Drawing Sheets

SCANNING OPTICAL APPARATUS AND IMAGE FORMING APPARATUS

BACKGROUND OF THE INVENTION

1. Field of the Invention

The present invention generally relates to a scanning optical apparatus for scanning light beams, and particularly relates to a scanning optical apparatus employable in an electrophotographic-type image forming device.

2. Description of the Related Art

In recent years, the productivity of exposure units in an image forming apparatus such as printers and copiers has become increasingly important. The productivity of an exposure unit is determined by a number of lines to be exposed (number of scans) on an image carrier (a photosensitive body formed that is a photosensitive drum) per unit time. Conceivable methods to improve the productivity include increasing the rotation speed of a polygon motor, and increasing the number of faces of a polygonal mirror (rotating multifaceted mirror).

However, the rotation speed of the polygonal motors is currently approaching a limiting value. Further increasing the rotation speed would bring about increases in temperature, noise level and cost, and it is not therefore desirable to do so. Also, since increasing the number of faces of the polygonal mirror results in a reduction in a scanning angle for a single scan on the image carrier, optical path had to be lengthened to obtain the same exposure width. This leads to increases in the size and cost of the apparatus.

To deal with such problems, a multibeam method has been proposed (Japanese Patent Laid-Open No. 2006-116716) in which the number of beams used in a single scan is increased. Conventionally, laser diodes with an edge-emitting construction have been mainly used. To realize the multibeam method, however, laser diodes with a surface-emitting construction (hereinafter referred to as surface-emitting lasers) have been developed. The use of surface-emitting lasers is expected to improve the productivity of exposure units.

It is also desirable to improve resolution. To do so, it is necessary to reduce dot size. However, it is not possible to reduce the dot size only by using the surface emitting laser. One method for reducing the size of the dots makes use of multiple exposures.

FIG. 14 is a diagram showing an example of a single exposure performed using a conventional single scan. A negative charge is applied in advance to the photosensitive drum. When the negatively charged drum is irradiated with laser light, positive charges are generated in a CG layer (charge generation layer). The positive charges generated in the CG layer combine with the negative charges on the surface of the drum via a CT layer (charge transfer layer). This causes a drop in potential at the surface of the photosensitive drum. When the amount of laser light is large at this point, a greater number of positive charges are generated. These positive charges then repel one another, causing the charge to spread when passing through the CT layer. Consequently, the spots of the latent image are undesirably larger in diameter than the exposed spots.

FIG. 15 is a diagram showing an example of a multiple exposure. In multiple exposure, the exposure is implemented by performing a plurality of exposures. Hence, the amount of laser light used in each of the plurality of exposures is less than the amount in the example shown in FIG. 15. Since fewer positive charges are generated in each exposure, the amount of charge which spreads when passing through the CT layer is reduced. Hence, the latent image spot diameter produced by the multiple exposures is smaller than a latent image spot diameter produced by the single exposure.

FIG. 16 is a diagram showing a surface-emitting laser beam arrangement for performing the multiple exposures, according to the related art. The emitting surface of the surface-emitting laser beam lies in the X-Y plane. Eight light-emitting portions denoted A1 to D2 are arranged in the X-Y plane. Two light-emitting portions are provided in each of rows A through D. For example, the light-emitting portions A1 and A2 have the same Y-coordinate. The distances P between the rows are identical. The X-coordinate differs for each light-emitting portion.

Here, a main scanning direction on the photosensitive body (a longitudinal direction of the photosensitive body) is assumed to be parallel to the X-axis. Hence, the same scan line is exposed by light source pair formed by the light-emitting portions A1 and A2. The scan lines are also identical for the light source pairs formed by B1 and B2, C1 and C2, and D1 and D2. The surface-emitting lasers shown in FIG. 16 are therefore capable of simultaneously exposing four scan lines disposed in a sub-scanning direction (the direction substantially perpendicular to the main scanning direction). Note also that the distance between (centers of) a first light-emitting portion and a second light-emitting portion in each light-source pair is X1.

FIG. 17 is a diagram showing a relationship between scan lines and light-emitting portions in the related art. FIG. 17 shows that, when the first to third scans are performed, twelve scan lines (four scan lines in each of the three scans) are formed. In the first scan, Line 1 to Line 4 are exposed, giving a total of four scan lines. In the second scan, Line 5 to Line 8 are exposed. In the third scan, Line 9 to Line 12 are exposed.

Note that the Lines 1, 5 and 9 are exposed using the light source pair formed by the light-emitting portions D1 and D2. The Lines 2, 6 and 10 are exposed using the light source pair formed by the light-emitting portions C1 and C2. The Lines 3, 7 and 11 are exposed using the light source pair formed by the light-emitting portions B1 and B2. The Lines 4, 8 and 12 are exposed using the light source pair formed by the light-emitting portions A1 and A2.

A distance (pitch) Psub between two adjacent scan lines on the photosensitive body, a distance (row gap) P between the light-emitting portions, and an optical magnification Msub in the sub-scanning direction of the scanning optical system are related by the following equation.

$$P\text{sub} = M\text{sub} \times P$$

The row gap P between the light-emitting portions is a value determined by the resolution of the image forming apparatus. For instance, if the resolution is 2400 DPI, the pitch Psub between the scan lines is as follows.

$$P\text{sub} = 25.4/2400 = 0.0105833$$

In other words, the pitch Psub is approximately 10.58 μm. The optical magnification Msub in the sub-scanning direction of the scanning optical system, on the other hand, is related to an optical efficiency.

Note that it is hard for a surface-emitting laser to output a larger amount of light than a laser with the edge emitter construction. This is because the semiconductor substrates are thin, and it is not therefore possible to form an oscillator large enough to perform the laser oscillation necessary to produce a larger amount of light. Thus, to compensate for the small amount of light outputted from the surface-emitting laser, optical efficiency and optical magnification have to be increased. For example, when the optical magnification Msub is set to ×3, the row gap P is as follows.

$$P = Psub/Msub = 0.0105833/3 = 3.53$$

Thus, the row gap P is approximately 3.53 μm.

A mask of semiconductor exposure apparatus used when manufacturing the laser devices is generally accurate to ±1 μm. Consequently, the manufacturing error in the light-emitting portions is ±1 μm. In other words, the row gap P can be anywhere from 2.53 μm to 4.53 μm in width. By a similar calculation, the error in the pitch Psub on the photosensitive body is ±3 μm due to the effects of the optical magnification. Errors of the order of 3 μm in the image causes unevenness of pitch, which leads to a deterioration in image quality. The unevenness of pitch is generated periodically with a period that depends on the number of beams and the number of polygon surfaces. Hence, when the number of beams is increased for the multibeam method, the spatial frequency of the unevenness of pitch also increases. Consequently, it is easy to visually confirm the unevenness of pitch. Conceivable methods for improving the manufacturing precision of the light-emitting portions include improving the precision of the semiconductor masks and the use of steppers in the manufacturing process. However, these both have the disadvantage of causing large increases in cost.

SUMMARY OF THE INVENTION

The present invention has as its feature the solving of one or more of the above-described problems or other problems. One feature of the present invention is the reduction of the effect of light source manufacturing errors on the pitch of the scan lines achieved by special arrangements of the light sources. Other problems and solutions will become apparent over the entire specification.

The present invention can be realized for example as a scanning optical apparatus for scanning a same scan line using a light source pair that includes at least two light sources. The scanning optical apparatus includes: a first group of light sources which include a first light source of the light source pair and are lined up on a first line and a second group of light sources which include a second light source of the light source pair and are lined up on a second line.

The first line and the second line are inclined with respect to reference lines corresponding to scan lines, so that the first light source and the second light source of the light source pair scan a same scan line. Moreover, a distance between the first light source and the second light source of the light source pair is at least twice a distance between two adjacent light sources on the first line.

From an alternative viewpoint, the scanning optical apparatus includes a plurality of light sources arranged to take up positions in a matrix having i rows and j columns (where i and j are natural numbers). The plurality of light sources is arranged so that each row contains at least two light sources and each column contains only one light source. A light source pair is formed from two light sources from two adjacent rows so that the two light sources scan a same scan line. The rows are inclined with respect to reference lines that correspond to scan lines so that a first light source and a second light source of the light source pair scan the same scan line. A distance between the first light source and the second light source of the light source pair is at least twice a distance between two adjacent light sources in the rows.

Further features of the present invention will become apparent from the following description of exemplary embodiments with reference to the attached drawings.

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
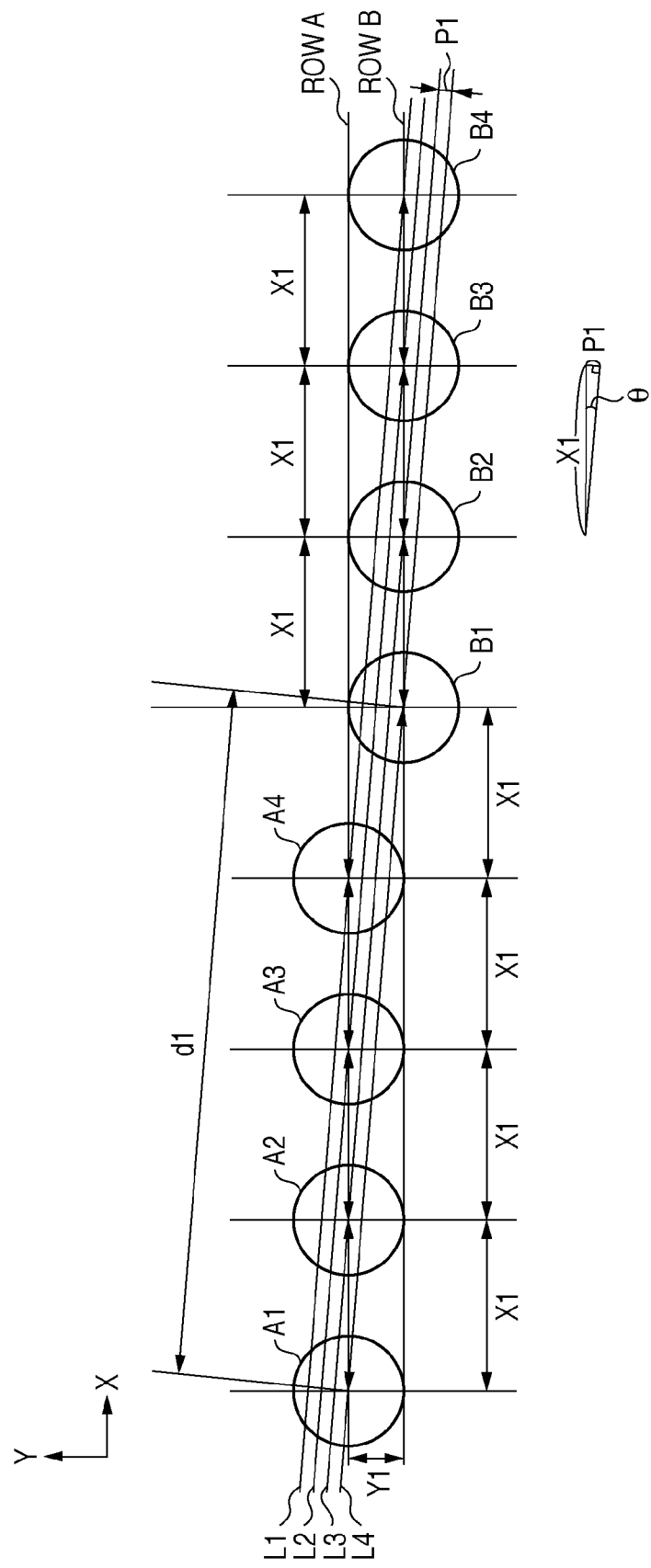
FIG. 1 is a diagram showing an example arrangement of light sources according to an embodiment.

FIG. 1 is a diagram showing an example arrangement of light sources according to an embodiment. The surface-emitting laser of the present example includes eight light sources (light-emitting portions). Row A and Row B are both parallel to the X-axis, and a row gap between row A and row B is Y1.

In row A, four light-emitting portions A1 to A4 are arranged with an equal spacing. The light-emitting portions A1 to A4 therefore have identical Y-coordinates. Thus, the light-emitting portions A1 to A4 are an example of a first group of light sources which include a first light source of a light source pair and are lined up on a first line. In row B, four light-emitting portions B1 to B4 are arranged with an equal spacing. The light-emitting portions B1 to B4 therefore have identical Y-coordinates. Thus, the light-emitting portions B1 to B4 are an example of a second group of light sources which include a second light source of the light source pair and are lined up on a second line.

Further, the distance between the centers of two adjacent light-emitting portions (such as a center of the light-emitting portion A1 and a center of the light-emitting portion A2) is X1. The light-emitting portions A1 to B4 have different X-coordinates (columns). Since, in reality, some error is introduced at manufacturing, it goes without saying that the spacing between the light-emitting portions will not be exactly equal. Here, equal spacing is used to mean approximately equal spacing. For the same reason, the Y-coordinates of the light-emitting portions A1 to A4 and the Y-coordinates of the light-emitting portions B1 to B4 are only approximately equal.

In the related art, the light source pairs were formed using two light-emitting portions belonging to the same row. In the present embodiment, however, each light source pair is formed from a light-emitting portion belonging to row A and a light-emitting portion belonging to row B. Note that the term "light source pair" is used to mean a set of light sources which scan a same scan line on the image carrier of the photosensitive body or the like. In FIG. 1, for example, the light-emitting portions A1 and B1 form a first light source pair. The light-emitting portions A2 and B2 form a second light source pair, the light-emitting portions A3 and B3 form a third light source pair, and the light-emitting portions A4 and B4 form a fourth light source pair.

As shown in FIG. 1, centers of the two light-emitting portions of the respective light-source pairs are joined by straight lines L1 to L4. The straight lines are substantially parallel. Note that the gap (distance between the centers) between the light-emitting portions A1 and B1 is d1. The gap between the light-emitting portions A2 and B2 is d2. The gap between the light-emitting portions A3 and B3 is d3. The gap between the light-emitting portions A4 and B4 is d4. Note also that the values of d1 to d4 are substantially the same. Moreover, as shown in FIG. 1, the distance between two adjacent straight lines (e.g. straight lines L1 and L2) is P1.

In the scanning optical apparatus of the present embodiment, a main scanning direction on the photosensitive body is parallel to the straight lines L1 to L4. However, the straight lines L1 to L4 are inclined relative to the X-axis. Specifically, an angle of θ is formed between the straight lines L1 to L4 and the X-axis, as shown in FIG. 1. Further, $\sin \theta = P1/X1$. Thus, the first line and the second line are inclined with respect to reference lines corresponding to scan lines so that the first light source and the second light source of the light source pair scan a same scan line. The first line and the second line correspond to row A and row B. The reference lines corresponding to the scan lines are the straight lines L1 to L4.

Figure 2:
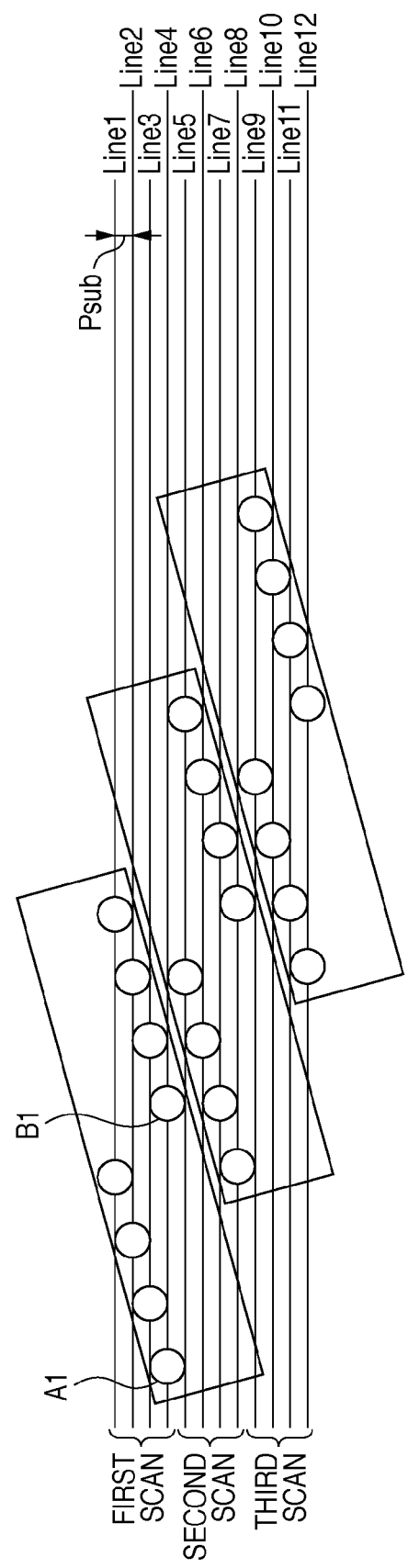
FIG. 2 is a diagram showing a relationship between scan lines and light-emitting portions according to the embodiment.

FIG. 2 is a diagram showing a relationship between scan lines and light-emitting portions according to the embodiment. FIG. 2 shows that, when the first to third scans are performed, twelve scan lines are formed. In the first scan, Line 1 to Line 4 are exposed give a total of four scanning lines. In the second scan, Line 5 to Line 8 are exposed. In the third scan, Line 9 to Line 12 are exposed.

Note that the Lines 1, 5 and 9 are exposed using the light source pair formed by the light-emitting portions A4 and B4. The Lines 2, 6 and 10 are exposed using the light source pair formed by the light-emitting portions A3 and B3. The Lines 3, 7 and 11 are exposed using the light source pair formed by the light-emitting portions A2 and B2. The Lines 4, 8 and 12 are exposed using the light source pair formed by the light-emitting portions A1 and B1.

A pitch Psub of adjacent scan lines on the photosensitive body, a distance P1 between the straight lines on the light-emitting portions, and an optical magnification Msub are related by the following equation.

$$P\text{sub} = M\text{sub} \times P1$$

Consideration of the similarity between the two triangles in FIG. 1 gives $\sin \theta = P1/X1 = Y1/d1$. Hence, P1 can be expressed using the following formula.

$$P1 = (X1/d1) \times Y1$$

As described above, the distance P1 between the straight lines over the light-emitting portions is determined by the resolution of the image forming apparatus. For example, when the resolution is 2400 DPI, the scan line pitch Psub on the photosensitive body is approximately 10.58 μm, as described above. When the optical magnification Msub is ×3, P1 is 3.53 μm.

In the case of surface-emitting lasers such as VCSELs (Vertical-Cavity Surface-Emitting Lasers), the external form of light-emitting portions must be of a certain size. This is because the amount of output light is determined by the external form of the light-emitting portions. For example, when the diameter φ of each light-emitting portion is 30 μm, the distance between adjacent light-emitting portions must be 30 μm or more. Thus, let it be assumed that X1 is 40 μm.

In this case, from $\sin \theta = P1/X1$, $$\sin \theta = 0.088.$$

This result is of great importance. For example, when the manufacturing error in X1 is ±1 μm, the error in P1 is then ±0.088 μm, which is substantially less than ±1 μm. That is, the error is compressed.

As is clear from FIG. 1, the distance d1 between the two light-emitting portions which form the light source pairs is at least four times the length of X1. Hence, $$P1 = 0.25 \times Y1.$$

Thus, Y1 is approximately 14.1 μm. Clearly, when the manufacturing error in Y1 is ±1 μm, the error in P1 is ±0.25 μm, which is substantially smaller than ±1 μm.

Thus, when the X-direction and Y-direction manufacturing errors in the light-emitting portions are each ±1 μm, the error in the distance P1 between the straight lines can be reduced to less than ±1 μm. Moreover, when the distance d1 between the first light source and the second light source of the light source pair is at least twice the distance X1 between two adjacent light sources on the first line (e.g. row A), the error is compressed. Similarly, when the distance d1 between the first light-emitting portion and the second light-emitting portion of the light source pair is at least twice the distance Y1 between the first line and the second line, the error is compressed.

It is particularly advantageous when the angle θ between the first and second lines (e.g. row A and row B) and the reference lines (e.g. straight lines L1 to L4) satisfies $0°<\theta<45°$. When the angle $\theta$ is in this range, $0<\sin\theta<0.707$, the compression of the error is marked.

Second Embodiment

In the second embodiment, like in the first embodiment, a plurality of light-emitting portions are arranged to take up positions in a matrix having i rows and j columns (where i and j are natural numbers). More specifically, the plurality of light-emitting portions is arranged so that at each row contains least two light-emitting portions and each column contains only one light-emitting portion.

Figure 3:
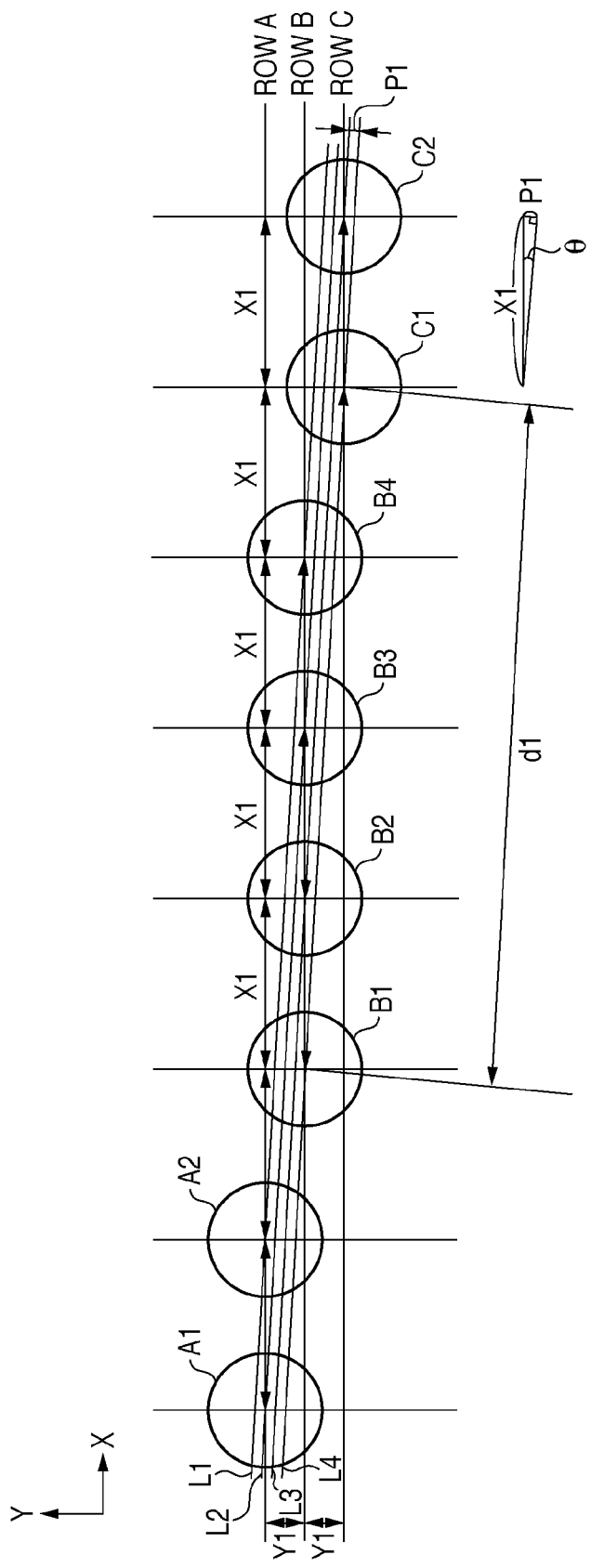
FIG. 3 is a diagram showing an example arrangement of light sources according to another embodiment.

FIG. 3 is a diagram showing an example arrangement of light sources according to the embodiment. The surface-emitting laser of the present example includes eight light sources (light-emitting portions). Row A, row B and row C are parallel to the X-axis. A row gap between row A and row B is Y1. A row gap between row B and row C is Y1.

Row A includes two light-emitting portions denoted A1 and A2. The light-emitting portions A1 and A2 therefore have identical Y-coordinates. The gap between the light-emitting portions A1 and A2 is X1. In row B, four light-emitting portions denoted B1 to B4 are arranged with an equal spacing (spacing of X1). The light-emitting portions B1 to B4 therefore have identical Y-coordinates. Row C includes two light-emitting portions denoted C1 and C2. The light-emitting portions C1 and C2 therefore have identical Y-coordinates.

The gap between the light-emitting portions C1 and C2 is X1. The light-emitting portions A1 to C2 all have differing X-coordinates (belong to different columns). Thus, each column contains only one light-emitting portion. Since, in reality, some error is introduced at manufacturing, the spacing between the light-emitting portions is not exactly equal. Thus, equal spacing is used to mean approximately equal spacing. For the same reason, the Y-coordinates of the light-emitting portions A1 and A2, the Y-coordinates of the light-emitting portions B1 to B4, and the Y-coordinates of the light-emitting portions C1 and C2 are only approximately equal.

In the related art, the light source pairs were formed using two light-emitting portions belonging to the same row. In the present embodiment, however, light source pairs are formed from light-emitting portions belonging to row A and light-emitting portions belonging to row B. Similarly, light source pairs are formed from light-emitting portions belonging to row B and light-emitting portions belonging to row C. In FIG. 3, for example, the light-emitting portions A1 and B3 form a first light source pair. The light-emitting portions A2 and B4 form a second light source pair. The light-emitting portions B1 and C1 form a third light source pair. And the light-emitting portions B2 and C2 form a fourth light source pair. Thus, each light source pair is formed from two light-emitting portions from two adjacent rows so that the two light emitting portions scan a same scan line.

As shown in FIG. 3, centers of the light-emitting portions of respective light-source pairs are joined by the straight lines L1 to L4. The straight lines are substantially parallel. Note that the gap between the light-emitting portions A1 and B3 is d1, the gap between the light-emitting portions A2 and B4 is d2, the gap between the light-emitting portions B1 and C1 is d3, and the gap between the light-emitting portions B2 and C2 is d4. Note that the lengths of d1 to d4 are substantially the same. Moreover, as shown in FIG. 3, the distance between two adjacent straight lines (e.g. straight lines L1 and L2) is P1.

In the scanning optical apparatus of the present embodiment, the main scanning direction on the photosensitive body is parallel to the straight lines L1 to L4. However, the straight lines L1 to L4 are inclined relative to the X-axis. An angle of $\theta$ is therefore formed between the straight lines L1 to L4 and the X-axis, as shown in FIG. 3. Further, $\sin\theta=P1/X1$. Thus, the rows are inclined with respect to reference lines which correspond to scan lines so that a first light-emitting portion and a second light-emitting portion of the light source pair scan the same scan line.

Figure 4:
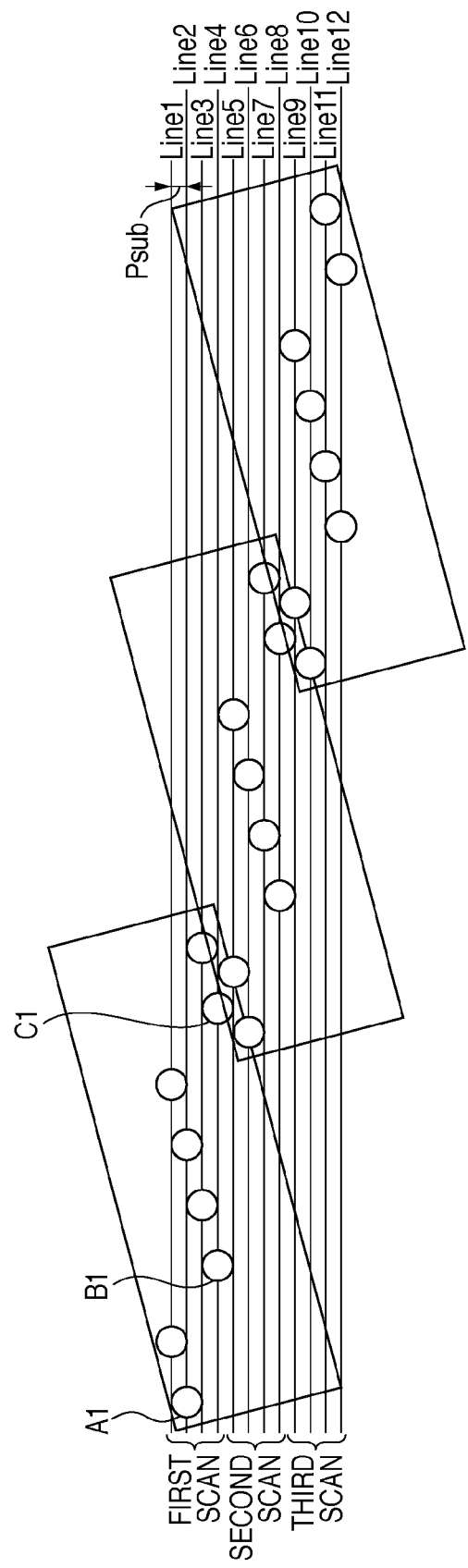
FIG. 4 is a diagram showing a relationship between the scan lines and the light-emitting portions according to the embodiment.

FIG. 4 is a diagram showing a relationship between the scan lines and the light-emitting portions according to the embodiment. FIG. 4 shows that, when the first to third scans are performed, twelve scan lines are formed. In the first scan, Line 1 to Line 4 are exposed give a total of four scan lines. In the second scan, Line 5 to Line 8 are exposed. In the third scan, Line 9 to Line 12 are exposed.

Note that the Lines 1, 5 and 9 are exposed using the light source pair formed by the light-emitting portions A2 and B4. The lines 2, 6 and 10 are exposed using the light source pair formed by the light-emitting portions A1 and B3. The Lines 3, 7 and 11 are exposed using the light source pair formed by the light-emitting portions B4 and C2. The Lines 4, 8 and 12 are exposed using the light source pair formed by the light-emitting portions B3 and C1.

The relationship between Psub, P1, Msub, X1 and Y1 of the first embodiment also holds for the second embodiment. For example, when the resolution is 2400 DPI, the scan line pitch Psub on the photosensitive body is approximately 10.58 μm. Further, when the optical magnification Msub is ×3, P1 is approximately 3.53 μm. With X1 set to 40 μm, sin θ is 0.088.

Hence, in the second embodiment, when the manufacturing error in X1 is ±1 μm, the error in P1 is ±0.088 μm, substantially smaller than ±1 μm. Moreover, like in the first embodiment, when the manufacturing error in Y1 is ±1 μm, the error in P1 is ±0.25 μm, substantially smaller than ±1 μm.

Thus, the second embodiment also allows the error in the distance P1 between the straight lines to be reduced in comparison to the X-direction and Y-direction manufacturing errors in the locations of the light-emitting portions. Thus when the distance between the first light-emitting portion and the second light-emitting portion of the light source pair is at least twice the distance X1 between two adjacent light-emitting portions on the first line, the error is compressed. Similarly, when the distance between the first light-emitting portion and the second light-emitting portion of the light source pair is at least twice the distance Y1 between the first line and the second line, the error is compressed.

It is particularly advantageous when, the angle $\theta$ between the first and second lines (e.g. row A, row B, or row C) and the reference lines (e.g. straight lines L1 to L4) satisfies $0°<\theta<45°$. When the angle $\theta$ is in this range, $0<\sin\theta<0.707$, the compression of the error is marked.

The following describes exposure methods for different resolutions using the light-emitting portions shown in FIG. 3. A scan line resolution is changed by rotating a substrate (e.g. a surface-emitting laser package) on which a first group of light sources (e.g. light-emitting portions A1 and A2) and a second group of light sources (e.g. light-emitting portions B1 and B2) have been implemented.

Figure 5:
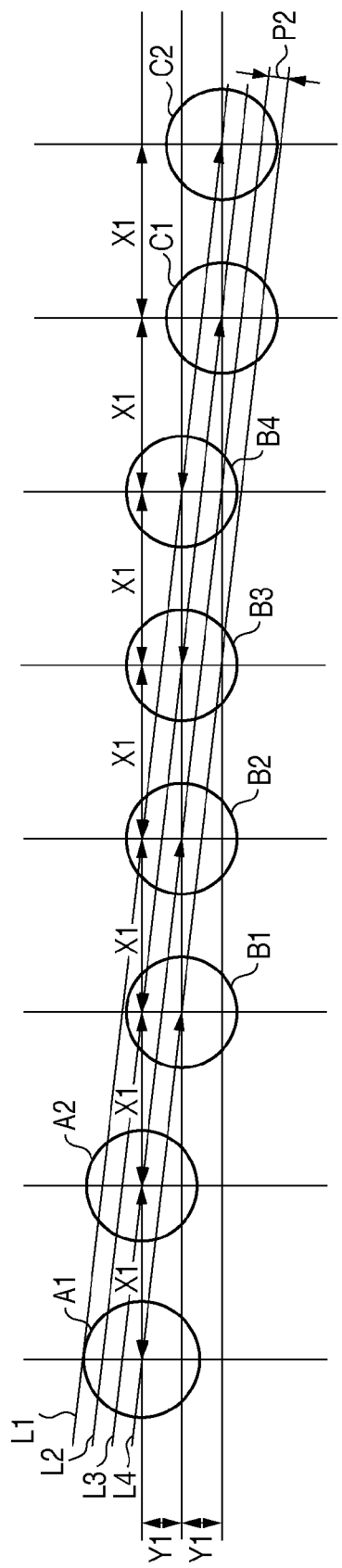
FIG. 5 is a diagram showing a relationship between the scan lines and the light-emitting portions according to the embodiment.

FIG. 5 is a diagram showing a relationship between scan lines and light-emitting portions according to the present embodiment. As is clear from a comparison with FIG. 3, the combinations of the two light-emitting portions in the light source pairs have been changed. For example, the light-emitting portions A1 and B1 form a first light source pair. The light-emitting portions A2 and B2 form a second light source pair. The light-emitting portions B3 and C1 form a third light source pair. The light-emitting portions B4 and C2 form a fourth light source pair.

As shown in FIG. 5, centers of the two light-emitting portions of the respective light-source pairs are joined by straight lines denoted L1 to L4. The straight lines are substantially parallel. Note that a gap between the light-emitting portions A1 and B1 is d1', a gap between the light-emitting portions A2 and B2 is d2', a gap between the light-emitting portions B3 and C1 is d3', and a gap between the light-emitting portions B4 and C2 is d4'. Note also that the lengths of d1' to d4' are substantially the same. Moreover, as shown in FIG. 5, the distance between two adjacent straight lines (e.g. straight lines L1 and L2) is P2.

Figure 6:
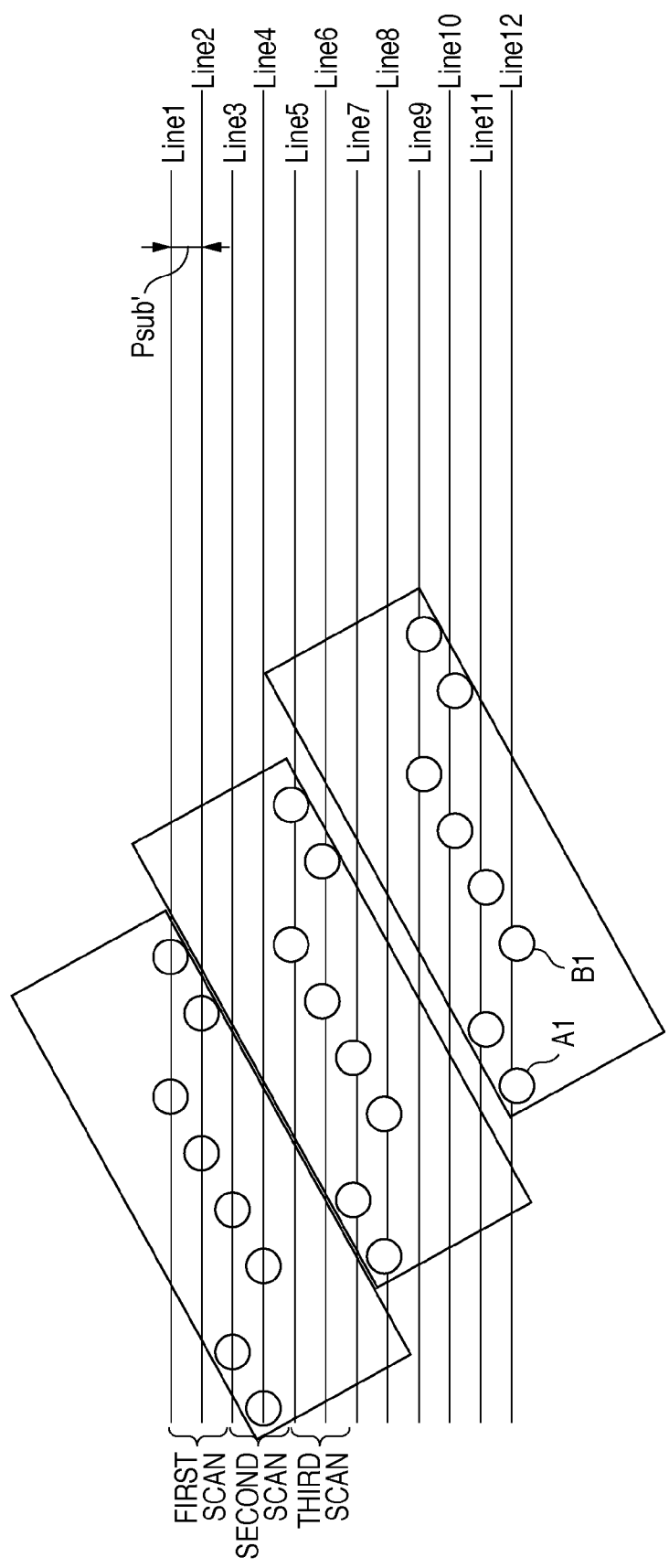
FIG. 6 is a diagram showing a relationship between the scan lines and the light-emitting portions according to the embodiment.

FIG. 6 is a diagram showing a relationship between scan lines and light-emitting portions according to the present embodiment. FIG. 6 shows that, when the first to third scans are performed, twelve scan lines are formed. In the first scan, Line 1 to Line 4 are exposed give a total of four scan lines. In the second scan, Line 5 to Line 8 are exposed. In the third scan, Line 9 to Line 12 are exposed.

Note that the Lines 1, 5 and 9 are exposed using the light source pair formed by the light-emitting portions B4 and C2. The Lines 2, 6 and 10 are exposed using the light source pair formed by the light-emitting portions A3 and C1. The Lines 3, 7 and 11 are exposed using the light source pair formed by the light-emitting portions A2 and B2. The Lines 4, 8 and 12 are exposed using the light source pair formed by the light-emitting portions A1 and B1.

The following equation relates a pitch Psub' of adjacent scan lines on the photosensitive body, the distance P2 between the straight lines over the light-emitting portions, and the optical magnification Msub.

$$P\text{sub}'=M\text{sub}\times P2$$

Furthermore, consideration of the similarity between the two triangles in FIG. 5 gives $\sin \theta = P2/X1 = Y1/d1'$. Hence, P2 can be expressed using the following formula.

$$P2=(X1/d1')\times Y1$$

As described above, the distance P2 between the straight lines over the light-emitting portions is determined by the resolution of the image forming apparatus. For example, when the resolution is 1200 DPI, the pitch Psub' of the scan lines on the photosensitive body is approximately 21.17 µm, as described above. When the optical magnification Msub is ×3, P2 is approximately 7.06 µm.

Further, when X1 is assumed to be 40 µm, $\sin \theta' = P2/X1$ gives $$\sin \theta' = 0.176.$$

This result is of great importance. For example, when it is assumed that the manufacturing error in X1 is ±1 µm, the error in P2 is ±0.176 µm, which is substantially less than ±1 µm. In other words, the error is compressed.

As is clear from FIG. 5, the distance d1' between the two light-emitting portions which form the light source pairs is at least twice the length of X1. Hence, $$P2=0.50\times Y1.$$

Hence, when the manufacturing error in Y1 is ±1 µm, the error in P2 is ±0.50 µm, substantially less than ±1 µm.

Thus, the second embodiment has the advantage of being capable of supporting different resolutions by changing the combinations of the light-emitting portions in the light source pairs and rotating the emitting plane on which the light-emitting portions are arranged. In other words, it is possible to form an image of a different resolution by simply changing the angle of inclination with respect to the X-axis from θ to θ'.

When scanning a scan line at a first resolution, the first and second lines (e.g. L1) form an angle of θ with respect to the reference lines (e.g. the X-axis). When scanning a scan line at a second resolution, the first and second lines form an angle of θ' with respect to the reference line. Here, it is desirable that the ratio of sin θ to sin θ is substantially an integer. Moreover, it is desirable that the difference Δθ between the angles θ and θ' satisfies 0°<Δθ<45°. The reasons for this are as follows.

For example, when θ'=10.1° and θ=5.0°, the rotation angle is small. This has the advantage that a deflection angle relationship between an optical lens and the semiconductor laser is not greatly changed by the rotation. In order to miniaturize and reduce the cost of scanning optical systems, plastic lenses are sometimes used as optical lenses. However, since semiconductor lasers have a characteristic deflection angles, directing laser light at a plastic lens using different deflection angle can result in undesirable secondary refraction. To avoid secondary refraction, it is therefore advantageous to reduce an amount of change in the deflection angle. In the present embodiment, the amount of adjustment of the rotation angle can be kept small. Consequently, the change in the deflection angle can be kept small, and secondary refraction is unlikely to occur.

Third Embodiment

In the third embodiment, a plurality of light-emitting portions are arranged to take up positions in a matrix having i rows and j columns (where i and j are natural numbers). More specifically, the light-emitting portions are arranged so that each row and each column contains at least two light-emitting portions and only one light-emitting portion is contained in any two adjacent rows of a same column.

Figure 7:
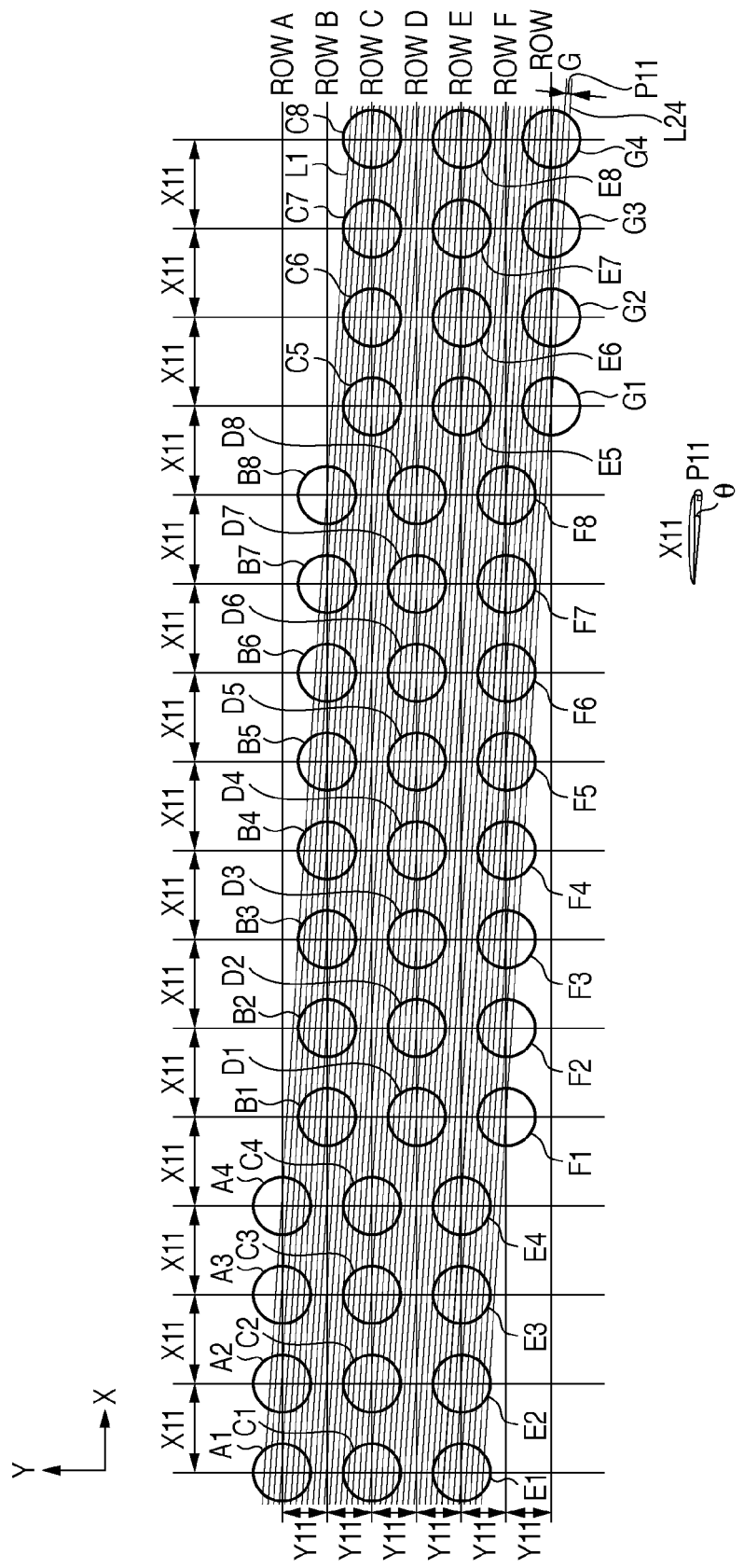
FIG. 7 is a diagram showing an example arrangement of light sources according to a further embodiment.

FIG. 7 is a diagram showing an example arrangement of light sources according to the embodiment. The surface-emitting laser of the present example includes forty-eight light sources (light-emitting portions). Each of row A to row G is parallel to the X-axis. The gap between any two adjacent rows (e.g. row A and row B) is Y11.

Row A includes four light-emitting portions denoted A1 to A4. The light-emitting portions A1 to A4 therefore have identical Y-coordinates. The gap between adjacent light-emitting portions is X1.

Row B includes eight light-emitting portions denoted B1 to B8. The light-emitting portions B1 to B8 therefore have identical Y-coordinates. The gap between adjacent light-emitting portions is X1.

Row C includes eight light-emitting portions denoted C1 to C8. The light-emitting portions C1 to C8 therefore have identical Y-coordinates. The basic gap between adjacent light-emitting portions is X11. However, the gap between the light-emitting portions C4 and C5 is 9×X11. Note that the X-coordinate of the light-emitting portion C1 is identical to the X-coordinate of the light-emitting portion A1. Similarly, the X-coordinates of the light-emitting portions C2 to C4 correspond to the X-coordinates of the light-emitting portions A2 to A4.

Row D includes eight light-emitting portions denoted D1 to D8. The light-emitting portions D1 to D8 therefore have identical Y-coordinates. The gap between adjacent light-emitting portions is X11. Note that the X-coordinate of the light-emitting portion D1 is identical to the X-coordinate of the light-emitting portion B1. Similarly, the X-coordinates of the light-emitting portions D2 to D8 correspond to the X-coordinates of the light-emitting portions B2 to B8.

Row E includes eight light-emitting portions denoted E1 to E8. The light-emitting portions E1 to E8 therefore have identical Y-coordinates. The basic gap between adjacent light-emitting portions is X1. However, the gap between the light-emitting portions E4 and E5 is 9×X11. Note that the X-coordinate of the light-emitting portion E1 is identical to the X-coordinate of the light-emitting portions A1 and C1. Similarly, the X-coordinates of the light-emitting portions E2 to E8 correspond to the X-coordinates of the light-emitting portions C2 to C8.

Row F includes eight light-emitting portions denoted F1 to F8. The light-emitting portions F1 to F8 therefore have identical Y-coordinates. The gap between adjacent light-emitting portions is X11. The X-coordinate of the light-emitting portion F1 is identical to the X-coordinate of the light-emitting portion D1. Similarly, the X-coordinates of the light-emitting portions F2 to F8 correspond to the X-coordinates of D2 to D8.

Row G includes four light-emitting portions denoted G1 to G4. The light-emitting portions G1 to G4 therefore have identical Y-coordinates. The gap between adjacent light-emitting portions is X1. The X-coordinate of the light-emitting portion G1 is identical to the X-coordinate of the light-emitting portion E5. Similarly, the X-coordinates of the light-emitting portions G2 to G4 correspond to the X-coordinates of the light-emitting portions E6 to E8.

As is clear from FIG. 7, each column contains three light-emitting portions. For instance, a first column includes the light-emitting portions A1, C1 and E1. Thus, in the third embodiment, a plurality of light-emitting portions are included in a single column. The light-emitting portions are, however, never contained in adjacent rows (e.g. in row A and row B of the first column) of any single column. In FIG. 7, the light-emitting portions are located in alternate rows of each column.

Note that the light source pairs are formed using one light-emitting portion selected from each of two adjacent rows. For example, the light-emitting portions A1 and B5 form one of the light source pairs. Similarly, the light-emitting portions B1 and C5 form another of the light source pairs. Thus, twenty-four light source pairs exist in total. In this way, light source pairs are formed from of two light-emitting portions from two adjacent rows and differing columns in such a way that the light-emitting portions of each pair scan a same scan line.

The lines joining centers of the light-emitting portions which form the light-source pairs are twenty-four straight lines denoted L1 to L24, as shown in FIG. 7. The distances between the centers of the light-emitting portions which form the light source pairs are d1 to d24 respectively. Note also that the center-to-center distances d1 to d24 are the substantially the same. Moreover, the distances between adjacent straight lines are substantially the same. These distances are denoted P11. The straight lines are inclined with the respect to the X-axis (the rows) in the same way as in the other embodiments.

Figure 8:
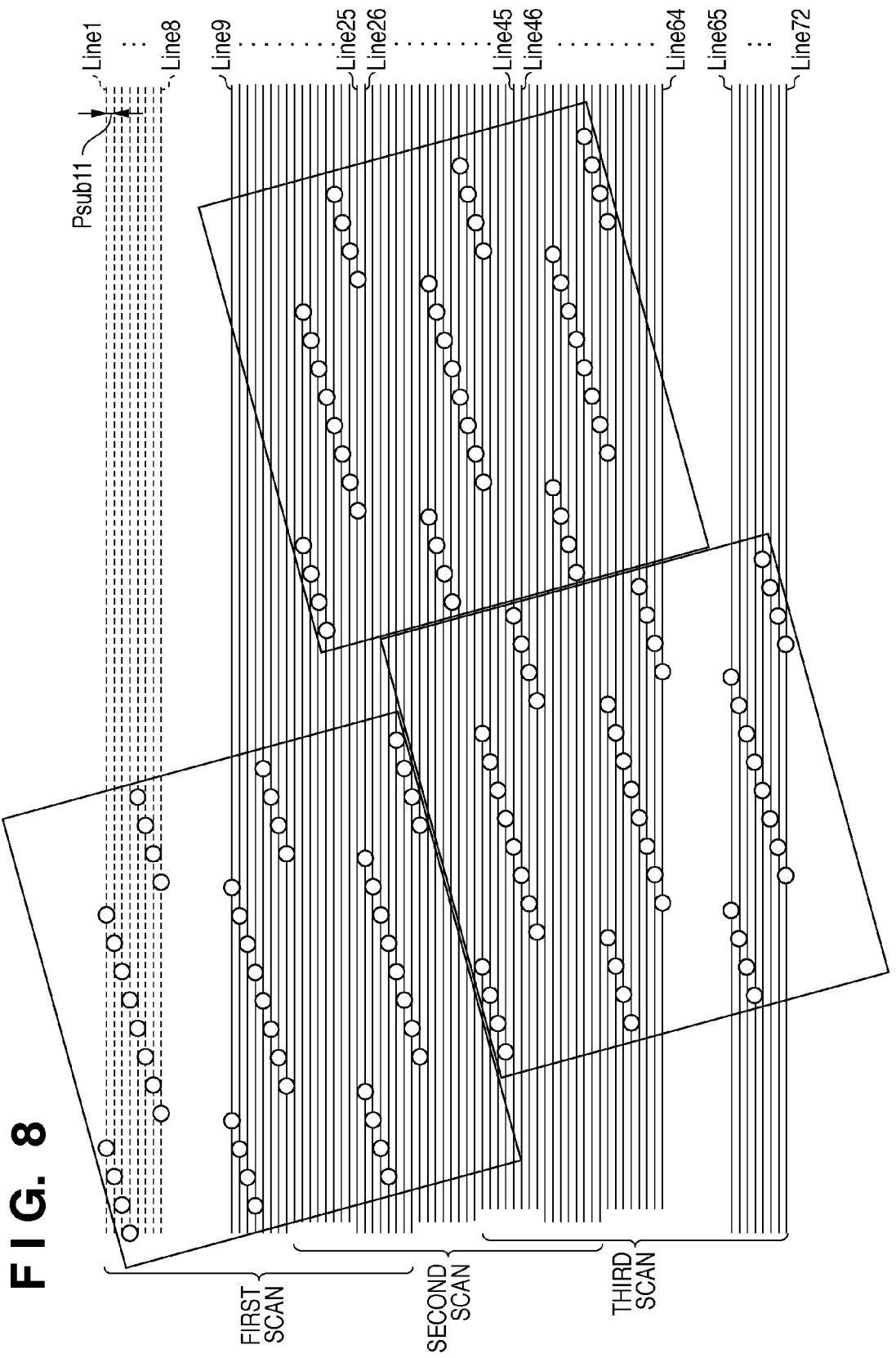
FIG. 8 is a diagram showing a relationship between the scan lines and the light-emitting portions according to the embodiment.

FIG. 8 is a diagram showing a relationship between scan lines and light-emitting portions according to the present embodiment. FIG. 8 shows that, when the first to third scans are performed, sixty-four scan lines are formed. Here, sixty-four scan lines are used rather than seventy-two because the scanning is interlace scanning. With interlace scanning, the light-emitting portions A1 to A4, B1 to B8 and C5 to C8 are not switched on in the first scan. Hence, the first scan does not form the scan Lines 1 to 8, which are indicated by dotted lines in FIG. 8.

In the first scan, the light-emitting portions A1 to A4, B1 to B8 and C5 to C8 are switched off and the remaining light-emitting portions are switched on. Hence, sixteen lines made up Line 9 to Line 16 and Line 25 to Line 32 are exposed. In the second scan, twenty-four lines made up Line 17 to Line 24, Line 33 to Line 40, and Line 49 to Line 56 are exposed. If the third scan is the final scan, the light-emitting portions E1 to E4, F1 to F8, and G5 to G8 are switched off for the third scan. Hence, sixteen lines made up Line 41 to Line 48, and Line 57 to Line 64 are exposed. If the third scan is not the final scan, the light-emitting portions E1 to E4, F1 to F8, and G5 to G8 are switched on for the third scan.

A pitch Psub11 of adjacent scan lines on the photosensitive body, a distance P11 between the adjacent straight lines over the light-emitting portions, and an optical magnification Msub11 are related by the following equation.

$P\text{sub}11 = M\text{sub}11 \times P11$

Further, when the angle between the straight lines on the photosensitive body and X-axis is denoted θ11, the following equation holds.

$P11 = X11 \times \sin \theta 11$

With a distance d between the light-emitting portions forming the light source pairs, a distance X11 between adjacent light-emitting portions in the same row, and a row gap Y11, it is possible to express P11 using the following equation.

$P11 = (X11/d) \times Y11$

As described above, the distance P11 between the straight lines on the photosensitive body is determined by the resolution. For example, when the resolution is 2400 DPI, the pitch Psub11 is approximately 10.58 μm. When the optical magnification Msub11 is ×3, P11 is approximately 3.53 μm. Moreover, when X11 is 40 μm, sin θ11=0.088.

When the manufacturing error in X11 is ±1 μm, the error in P11 is ±0.088 μm, which is substantially less than ±1 μm. In the Y-direction, d is at least four times the length X11. For example, when the manufacturing error in Y11 is ±1 μm, the error in P11 is ±0.25 μm, substantially less than ±1 μm.

Thus, the third embodiment allows the error in the pitch P11 to be reduced in comparison to the X-direction and Y-direction manufacturing errors.

It is to be noted that aberrations exist in optical lenses. Thus in a system such as a multibeam scanning optical system, it is no easy matter to design and manufacture optical lenses having the most suitable optical characteristics for all the light-emitting portions. This is because the effect of the aberrations increases with the distance from the center of the optical lenses. It is therefore advantageous to use an arrangement in which the light-emitting portions are concentrated, as far as possible, towards the center of the optical lenses. When using conventional edge-emitter laser diodes, it was difficult to concentrate the light-emitting portions towards the center of the optical lenses. However, surface-emitting laser diodes can be formed into a two-dimensional arrangement. With regard to aberration, surface-emitting laser diodes therefore have an advantage over edge-emitter laser diodes.

However, problems can occur when the distance P11 between the straight lines which join the two light-emitting portions making up the light source pairs is smaller than an external diameter of the light-emitting portions. For instance, when a plurality of light-emitting portions are lined up in the Y-direction, the gaps between the light-emitting portions will be a multiple of P11. It is therefore necessary to expose a number of scan lines corresponding to a multiple of the distance P11 between the straight lines. In FIG. 7, for example, the gap between light-emitting portions A1 and C1 is twice Y11 and sixteen times P11. However, because the light-emitting portions A1 to A4, B1 to B8, and C5 to C8 expose only eight scan lines, all sixteen scan lines cannot be exposed.

A conceivable way to prevent this would be, for example to double the number of light-emitting portions. However, if the number of light-emitting portions is doubled, the gap between the leftmost light-emitting portions and the rightmost light-emitting portions in the X-direction will increase, and the image quality will drop due to the effects of the aberration.

For this reason, it is advantageous to perform the interlace scanning in the manner shown in FIG. 8. Thus, it is possible to reduce the effects of the aberration by performing the exposure at a constant pitch using a plurality of light-emitting portions arranged in the Y-direction (i.e. in the same column) and reducing the gaps between the light-emitting portions lined up in the X-axis direction.

Figure 9:
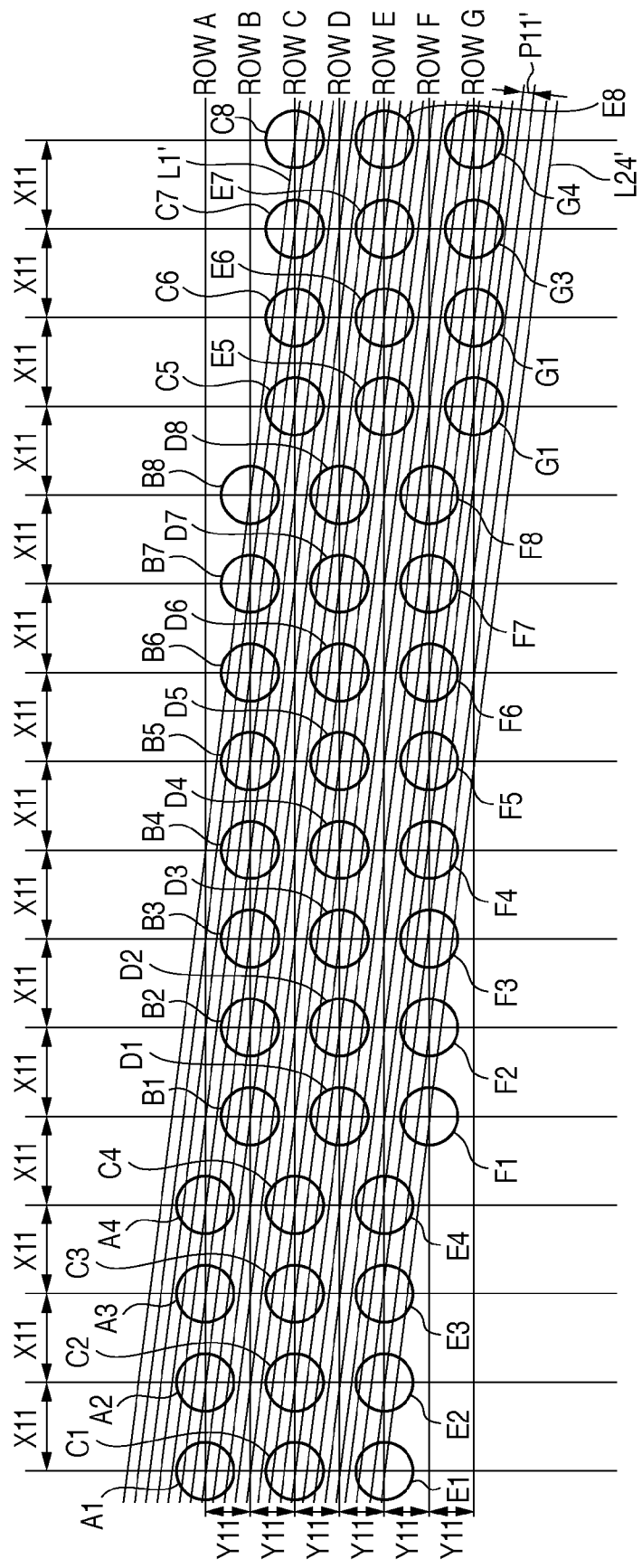
FIG. 9 is a diagram showing a relationship between the scan lines and the light-emitting portions according to the embodiment.

FIG. 9 is a diagram showing a relationship between scan lines and light-emitting portions according to the present embodiment. A method for realizing a different resolution using the same surface-emitting lasers is described below with reference to FIG. 9. The basic principle behind this method is to change the resolution of the scan lines by rotating, in the manner described in the second embodiment, the substrate on which the plurality of light sources have been implemented. The combinations of two light-emitting portions in the light source pairs are changed. As a result, it is possible to change from a first resolution to second resolution.

In FIG. 9, for example, the light-emitting portions A1 and B1 form a first light source pair. The light-emitting portions A2 and B2 form a second light source pair. The light-emitting portions A3 and B3 form a third light source pair. The light-emitting portions A4 and B4 form a fourth light source pair. With the remaining light source pairs included, there are a total of twenty-four light source pairs.

The straight lines joining centers of the light-emitting portions which form the light-source pairs are twenty-four straight lines denoted L1' to L24', as shown in FIG. 9. Note that the distances between the centers of the light-emitting portions which form the light source pairs are d1' to d24' respectively. Note also that the center-to-center distances d1' to d24' are the substantially the same. Moreover, the distances between adjacent straight lines are substantially the same. These distances are denoted P11'.

As is clear from a comparison of FIG. 9 with FIG. 7, the distances between the centers of the light-emitting portions forming the light source pairs have been changed. Hence, there is a corresponding change in the distance between the adjacent straight lines. As a result, the resolution is changed.

Figure 10:
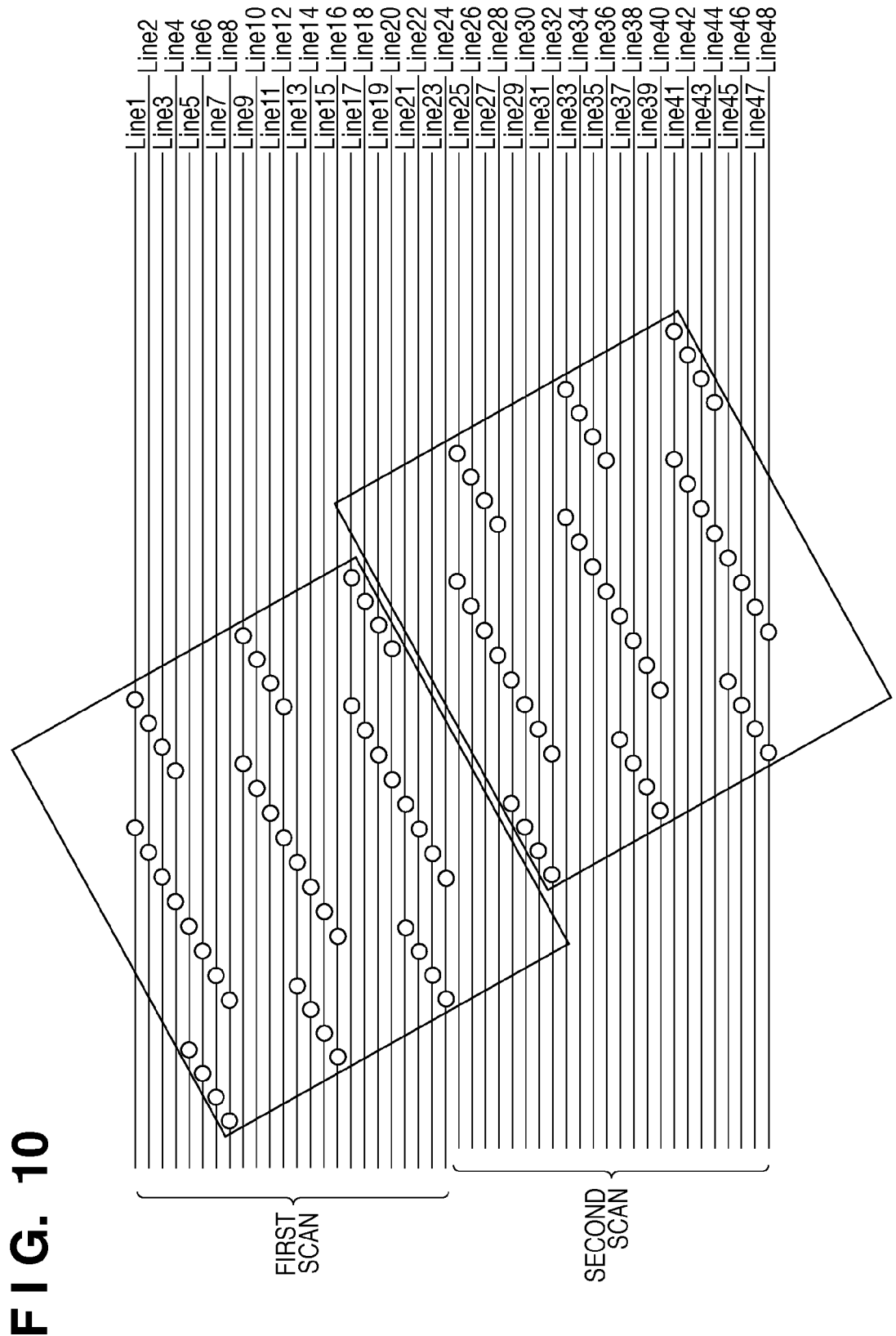
FIG. 10 is a diagram showing a relationship between the scan lines and the light-emitting portions according to the embodiment.

FIG. 10 is a diagram showing a relationship between scan lines and light-emitting portions according to the present embodiment. FIG. 10 shows that, when the first and second scans are performed, forty-eight scan lines are formed. In the first scan, Line 1 to Line 24 are exposed to give a total of twenty-four scan lines. In the second scan, Line 25 to Line 48 are exposed.

Note that the Lines 1 and 25 are exposed using the light source pair formed by the light-emitting portions B8 and C8. The relationships between the other Lines and light source pairs are shown in FIG. 10.

The relationship between a pitch Psub11' of the scan lines on the photosensitive body, the distance P11' between the straight lines joining the light-emitting portions, and the optical magnification Msub11 is expressed by the following equation.

$$P\text{sub}11' = M\text{sub}11 \times P11'$$

When an angle of θ11' is formed by the straight lines L1' to L24' with the X-axis and the gap between the light-emitting portions in each row is X11, the pitch Psub11' of the scan lines can be expressed using the following equation.

$$P11' = X11 \times \sin θ11'$$

When the similarity between triangles is considered in the manner described above, the following equation is realized.

$$P11' = X11/d1' \times Y11$$

The pitch P11' is determined by the resolution of the image forming apparatus. Here, when the resolution is 1200 DPI, the pitch Psub11' is approximately 21.17 μm. The optical magnification Msub11 is ×3. Thus, P11' is approximately 7.06 μm. Moreover, when X1 is set to 40 μm, sin θ21=0.176. When the manufacturing error in X1 is ±1 μm, the error in P11' is ±0.176 μm, which is substantially less than ±1 μm.

As shown in FIG. 9, for d1' to be at least twice X1, P11'=0.5×Y11. When the manufacturing error in Y11 is ±1 μm, the error in P11' is ±0.5 μm, which is substantially less than ±1 μm.

Thus, according to the third embodiment, when the distance between the first light-emitting portion and the second light-emitting portion in the light source pair is at twice least the distance X11 between any two adjacent light-emitting portions in the same row, the error is compressed. Similarly, when the distance between the first light-emitting portions and the second light-emitting portion of the light source pair is at least twice the distance Y11 between the rows, the error is compressed.

The present embodiment has the advantage of being able to support different resolutions through changes to the combinations of light-emitting portions in the light-source pairs and rotation of the emitting plane in which the light-emitting portions are arranged. It is possible to form an image of a different resolution by simply changing the angle of inclination with respect to the X-axis from θ11 to θ11'. For example, the angle of the rows with respect to the reference line can be set to θ11 when scanning the scan lines at a first resolution and to θ11' when scanning the scan lines at a second resolution. As described in the second embodiment, it is desirable that the angle θ11 and the angle θ11' are selected so that the ratio between sin θ11 and sin θ11' is substantially an integer and a difference Δθ between the angles θ11 and θ11' satisfies 0°<Δθ<45°. This is because, under such conditions, problems relating to the deflection angle can be decreased.

Note also that although interlace scanning was required when the resolution was increased, under the above-described conditions interlace scanning is not required when the resolution is increased.

Fourth Embodiment

The fourth embodiment is described with reference to an example of an image forming apparatus which can make use of the scanning optical apparatuses described in first to third embodiments.

Figure 11:
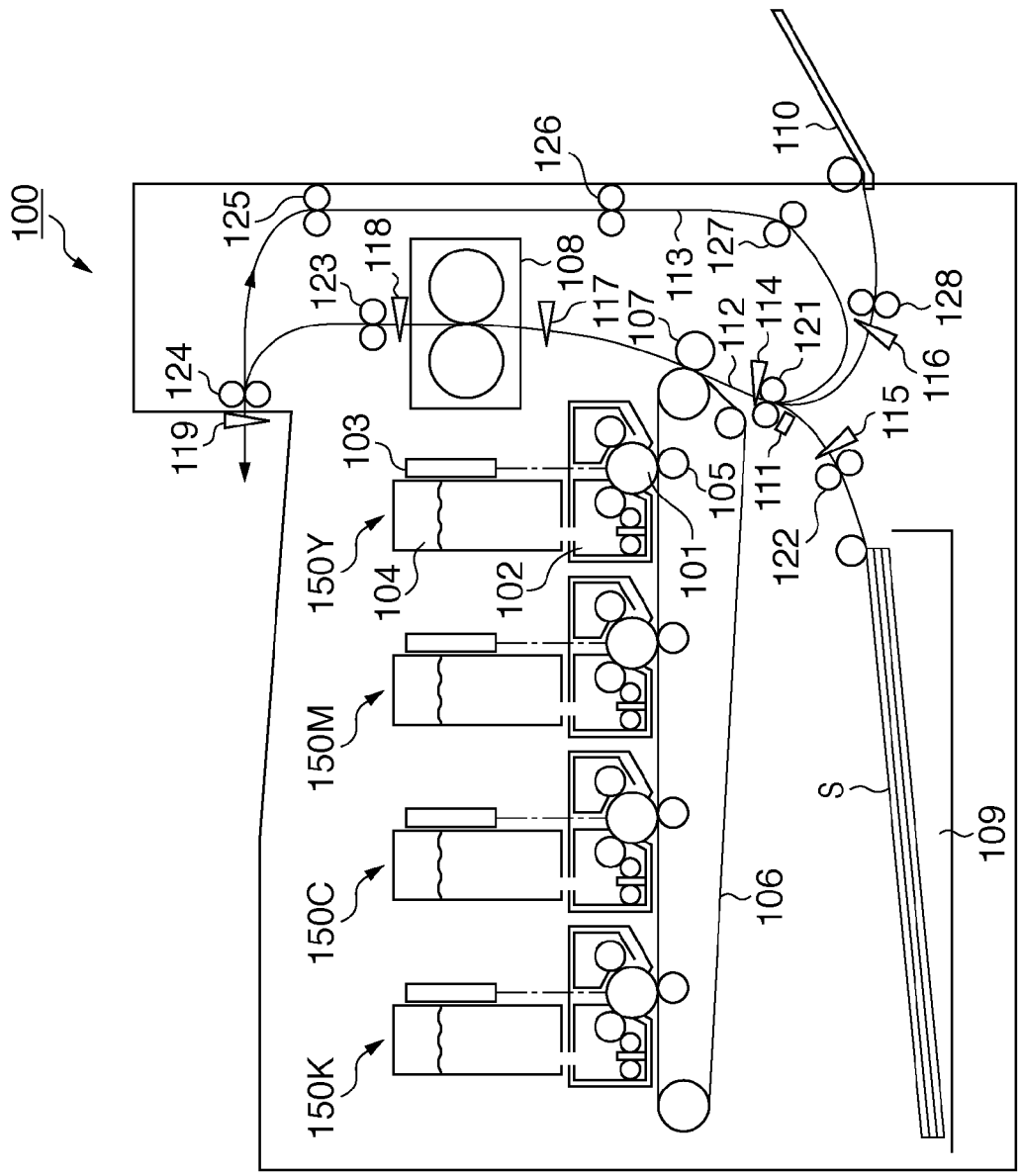
FIG. 11 is a cross-sectional view of the image forming apparatus according to still another embodiment.

FIG. 11 is a cross-sectional view of the image forming apparatus according to the embodiment. The image forming apparatus 100 is a so-called laser beam printer. The image forming apparatus may be used as a printer, a copier, a multifunction printer, a fax machine or the like.

The image forming apparatus 100 includes image forming stations 150Y, 150M, 150C, and 150K which correspond in number to the employed developer members (e.g. Y, M, C and K toners). Each image forming station includes a photosensitive drum 101 as an image carrier, a developer apparatus 102, a scanner 103 as the scanning optical apparatus, and a toner vessel 104. The scanner 103 is an example of the scanning optical apparatus in which a light source pair including at least two light sources is used to scan a same scan line.

As is well known, electrostatic latent images are formed by exposing, based on an image signal, the uniformly charged photosensitive drum 101 using the scanner 103. The photosensitive drum 101 is an example of an image carrier on which the latent image is formed by a light beams outputted from the plurality of the light sources included in the scanning optical apparatus. The electrostatic latent image is developed to form visible image (developed image) using the developer apparatus 102. The visible images corresponding to each toner are transferred to form multiple layers on an intermediate transfer body 106 by a primary transfer roller 105. The visible color image on the intermediate transfer body 106 is transferred to a recording medium by a secondary transfer roller 107. The secondary transfer roller 107 is an example of the transfer apparatus. The visible color image is fixed to the recording medium by a fixing apparatus 108.

Note that the recording medium (also referred to as a sheet member, a recording member, transfer member, or paper) S is conveyed from paper trays 109 and 110 via a conveyor path 112 or a double-sided conveyor path 113. A plurality of sensors is arranged at positions along the conveyor path 112 or the double-sided conveyor path 113 to detect the arrival or presence of a sheet member. The sensors may include a media sensor 111 which is an example of an optical-type sensor, a registration sensor 114 which is a flag-type sensor disposed adjacent to the position of the media sensor 111, and other sheet detection sensors 115, 116, 117, 118, and 119.

The sheet member detection signals outputted by the sensors may be used for registration, detecting sheet member jams, detecting the actual length of the sheet member, and controlling transfer timing, for example. Note also that "registration" is used to mean control to match the timing at which the sheet member is conveyed with a timing at which the visible color image formed on the intermediate transfer body 106 is conveyed.

The image forming apparatus 100 includes various conveyor rollers denoted 121 to 128 for conveying the sheet member S. More specifically, the conveyor roller 121 is called a registration roller and is used for registration. In the present embodiment, the above-described registration sensor 114 and media sensor 111 are provided in proximity to the registration roller.

Figure 12:
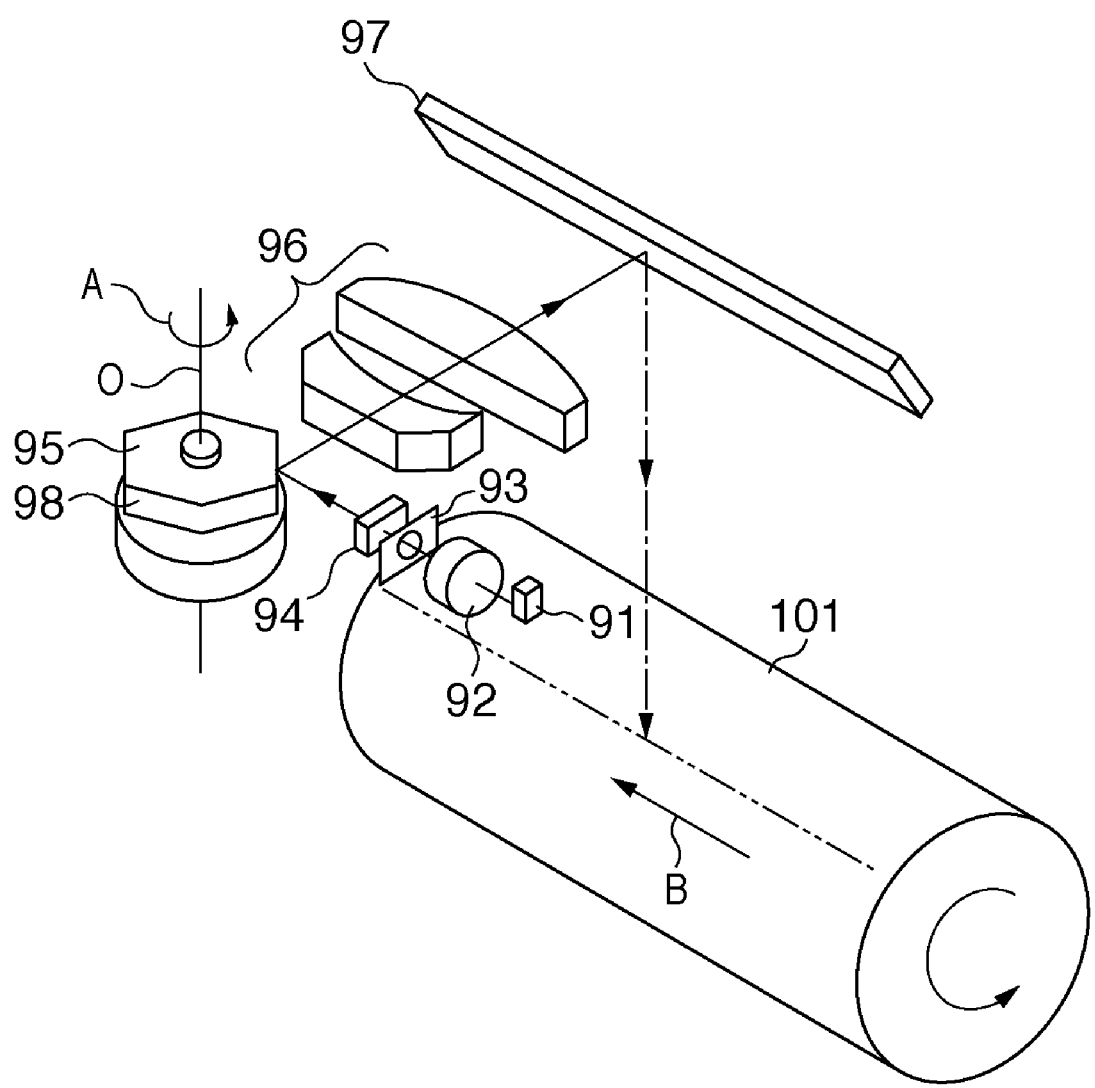
FIG. 12 is a diagram showing an example of the scanning optical apparatus according to the embodiment.

FIG. 12 is a diagram showing an example arrangement of the scanning optical apparatus according to the embodiment. The scanner 103 used in the image forming apparatus 100 periodically deflects the light beams outputted from the surface-emitting laser 91 using a light deflector such a rotating multifaceted mirror (e.g. a polygonal mirror). Thereafter, the light beams are focused as a spots on the surface of the photosensitive drum 101 by an imaging optical system having fθ characteristics.

The surface-emitting laser 91 is an example of an emitting unit that includes a plurality of light-emitting portions (light sources). The diverging light beams emitted from the surface-emitting laser 91 are collimated to form a substantially collimated light beams by a collimator lens 92. The external shape of the light beams is restricted by an aperture 93. The light beams are then incident on a cylindrical lens 94 having a predetermined refractive power only in the sub-scanning direction. The substantially collimated light beams incident on the cylindrical lens 94 are emitted unaltered as substantially collimated light beams in a main scanning cross-section. In a sub-scanning cross-section, however, the substantially collimated light beams are focused to form a line image on a deflecting surface (reflecting surface) 98 of a light deflector 95. The light beams reflected and deflected by the deflecting surface 98 are focused on the scanning surface formed by the surface of the photosensitive drum 101 via an optical image forming system 96 having fθ characteristics (e.g. an fθ lens) and a returning mirror 97. Note that the light beams are scanned over the surface of the photosensitive drum 101 in the direction of an arrow B (main scanning direction) by deflection as the light deflector 95 rotates in a rotation direction indicated by an arrow A.

Figure 13:
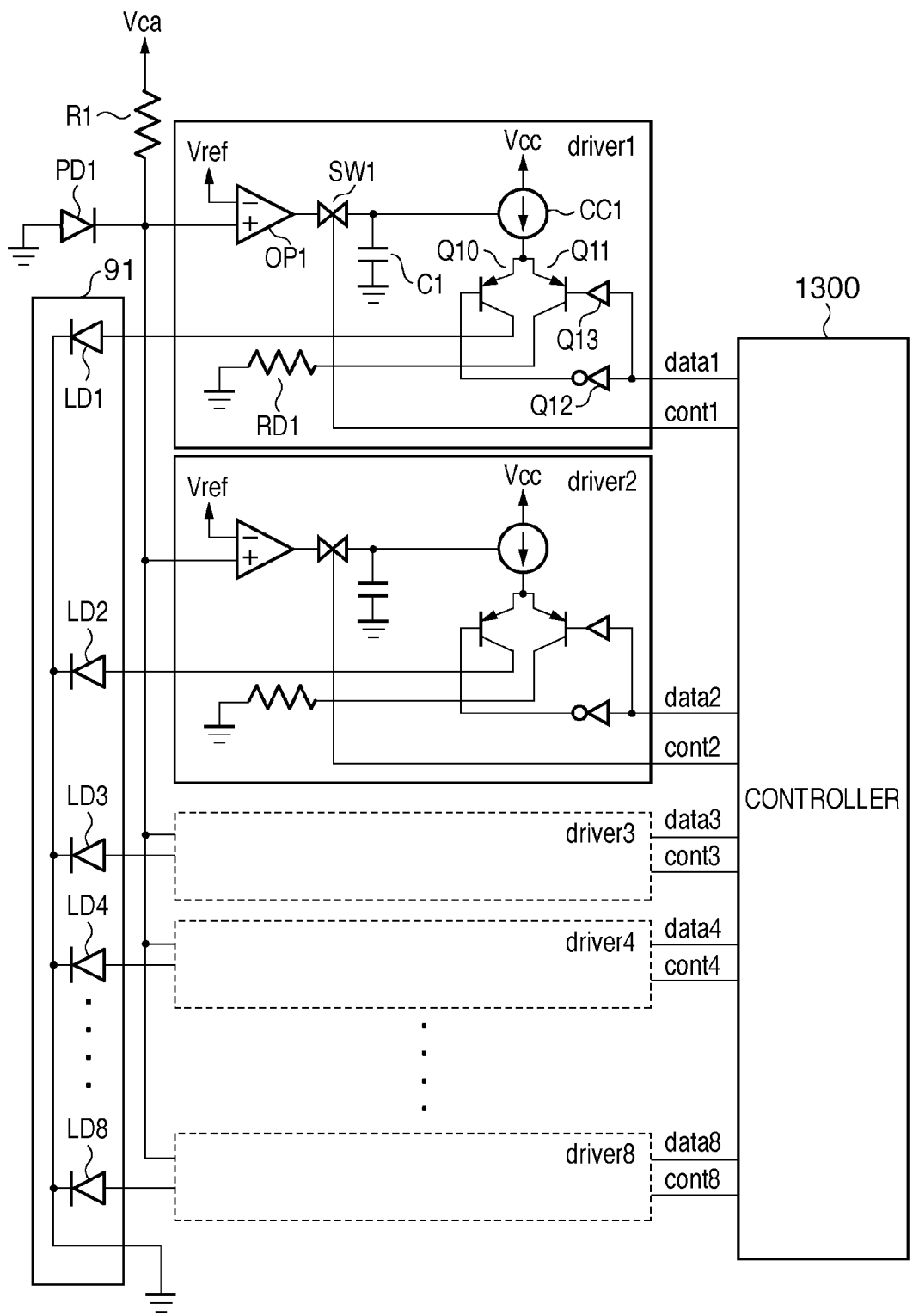
FIG. 13 is a diagram showing an example of a multibeam-type surface-emitting laser and driver circuit thereof according to the embodiment.
Figure 14:
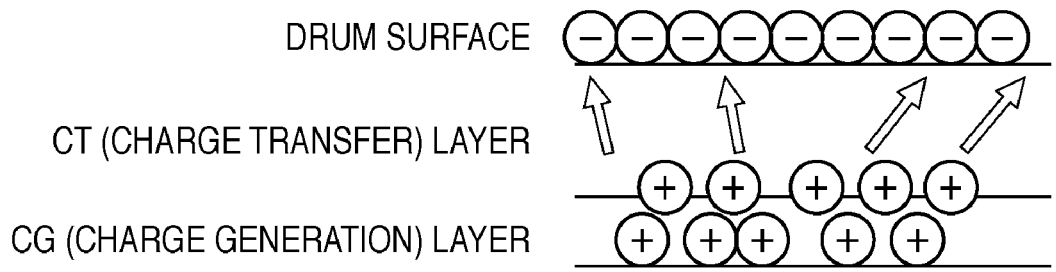
FIG. 14 is a diagram showing an example of a conventional single exposure.
Figure 15:
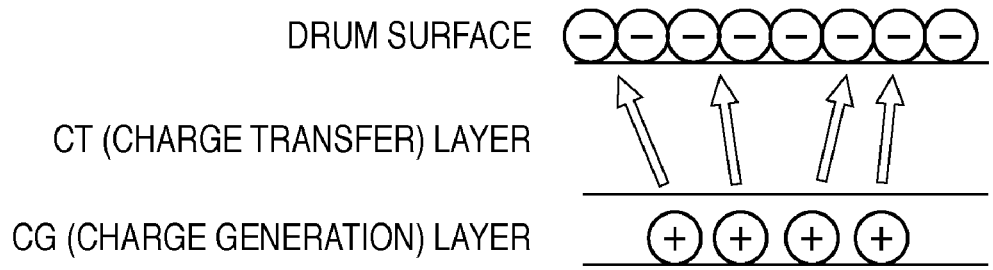
FIG. 15 is a diagram showing an example of a multiple exposure.
Figure 16:
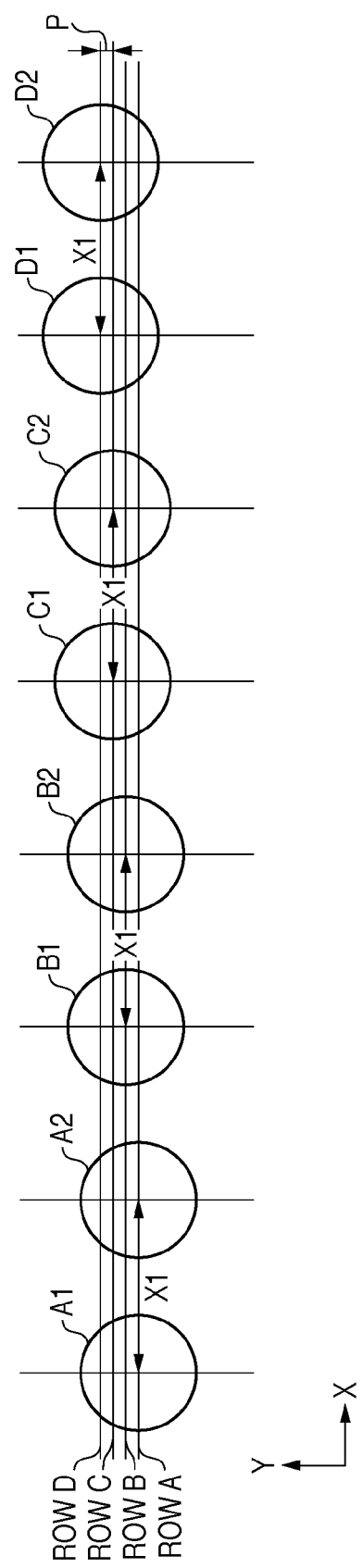
FIG. 16 is a diagram showing a surface-emitting laser beam arrangement for performing the multiple exposure according to the related art.
Figure 17:
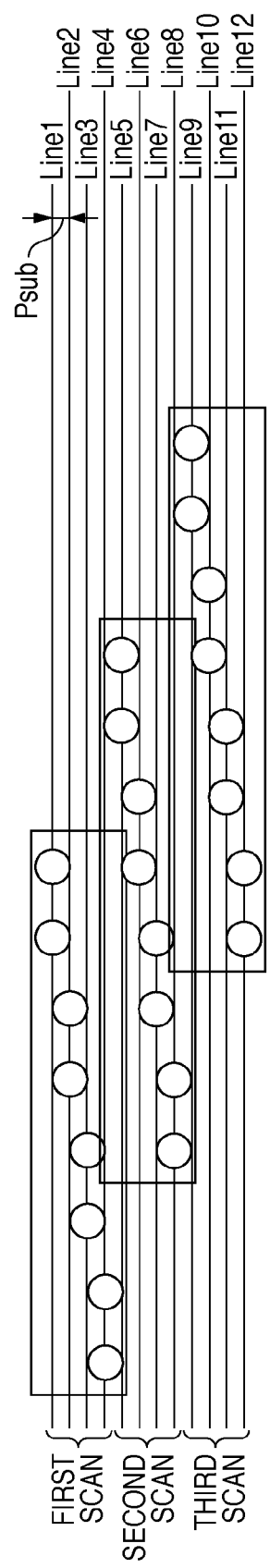
FIG. 17 is a diagram showing a relationship between the scan lines and the light-emitting portions in the related art.

FIG. 13 is a diagram showing an example of a multibeam-type surface-emitting laser and driver circuit. The surface-emitting laser 91 includes a plurality of light-emitting portions LD1 to LD8. Cathode terminals of the light-emitting portions LD1 to LD8 are connected to a common ground terminal. Anode terminals of the light-emitting portions LD1 to LD8 are connected to corresponding driver circuits denoted driver1 to driver8. The driver circuits driver1 to driver8 supply driving currents to the corresponding light-emitting portions. Since the driver circuits driver1 to driver8 are identically constructed, the operations of driver1 are described as representative example.

A photodiode PD1 monitors the amount of light from the light-emitting portions LD1 to LD8. An anode terminal of the photodiode PD1 is connected to ground. A cathode terminal of the photodiode PD1 is connected to a power supply Vcc via a resistor R1. The cathode terminal of the photodiode PD1 is connected to a + input terminal of an error amplifier OP1. A reference voltage Vref is applied to the − input terminal of the error amplifier OP1. The output terminal of the error amplifier OP1 inputs to an analog switch SW1.

A cont1 signal is inputted to a control terminal to control operations of the analog switch SW1. The cont1 signal is supplied from a controller 1300. The output terminal of the analog switch SW1 is connected to one terminal of a condenser C1. The output from the analog terminal switch SW1 is also inputted to a constant current source CC1 as a control signal. The other terminal of the condenser C1 is connected to ground.

The constant current source CC1 outputs a current which depends on an applied voltage. An output of the constant current source CC1 is connected to the emitter terminals of PNP transistors Q10 and Q11. The collector terminal of the PNP transistor Q10 forms the output of the driver1, and connects to the anode terminal of the laser diode LD1. The collector terminal of the PNP transistor Q11 is connected to a resistor RD1. The other terminal of the resistor RD1 is connected to ground. The base terminal of the PNP transistor Q10 receives input of a data1 signal from the controller 1300 via an inverter Q12. The base terminal of the PNP transistor Q11 receives input of the data1 signal via a buffer Q13. The data1 signal is supplied from memory included in the controller 1300. According to the present embodiment, the controller 1300 supplies identical data signals to the driver circuits of the two light emitting portions which form the light source pair.

The following describes the operations of the driver circuits in greater detail. First, the controller 1300 sets both the cont1 signal and the data1 signal to Hi to enter an auto-power control (APC) mode. The cont2 to cont8 signals and the data2 to data8 signals are set Lo. This arrangement is used to measure the amount of light being emitted from the light-emitting portion LD1 alone.

When the data1 signal is Hi, the output of the inverter Q12 is Lo, and the PNP transistor Q10 is ON. Conversely, the PNP transistor Q11 is OFF. When the PNP transistor Q10 is ON, the light-emitting portion LD1 is lit by a current supplied by the constant current source CC1. When the amount of light outputted by the light-emitting portion LD1 increases, an output current from the photodiode PD1 also increases. Conversely, a voltage inputted to the error amplifier OP1 drops.

The output from the photodiode PD1 is compared to the reference voltage Vref by the error amplifier OP1. Consequently, the output voltage from the error amplifier OP1 drops. Since the output voltage of the error amplifier OP1 drops, the output current from the constant current source CC1 decreases. When the output current from the constant current source CC1 decreases, the amount of light emitted from the light-emitting portion also decreases.

Thus, the driving circuit forms a negative feedback circuit, and the amount of light from the light-emitting portion LD1 (i.e. the driving current) is controlled so that the output voltages from the photodiode PD1 and Vref are identical. The amount of light emitted from the other light emitting portions LD2 to LD8 is controlled in the same way.

When switched to a printing mode, the controller 1300 sets the cont1 to cont8 signals Lo, and outputs image data as the data1 to data8 signals. When the cont1 signal is Lo, the analog switch SW1 is OFF. Consequently, the voltage fixed in the APC mode is held by the condenser C1. Since the voltage across the condenser C1 is applied to the control terminal of the constant current source CC1, the output of the constant current source CC1 is the current value set using the APC mode.

When the data1 signal is Hi, the PNP transistor Q10 is ON. Consequently, the light-emitting portion LD1 is lit. When the data1 signal is Lo, the PNP transistor Q10 is OFF. Consequently, the light-emitting portion LD1 is switched off. Hence, the light-emitting portion LD1 is driven to flash based on the image data.

When the data1 signal is Hi, the PNP transistor Q11 is OFF. When the data1 signal is Lo, the PNP transistor Q11 is ON. Hence, the current supplied by the constant current source CC1 is passed through the resistor RD1. Hence, the current supplied from the constant current source CC1 is constant and unaffected by the value of the data1 signal. The other light emitting portions LD2 to LD8 operate in a similar manner.

The above-described controller 1300 supplies identical data signals and control signals to the driver circuits of the two light-emitting portions in the light source pair. Thus, changing the combinations of driver circuits which are supplied with the same data signals and control signals causes a change in the make-up of the light source pairs, and changes the resolution. To change the resolution, the controller 1300 outputs a driving signal to a driving unit (not shown in the drawings) to drive the surface-emitting laser 91 so as to be inclined with respect to the X-axis of the surface-emitting laser 91.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-187603, filed Jul. 18, 2007, which is hereby incorporated by reference herein in its entirety.

What is claimed is:

1. A scanning optical apparatus for simultaneously scanning a plurality of scan lines, each same scan line being scanned using a light source pair that includes at least two light sources, the scanning optical apparatus comprising:

a first group of light sources which include a first light source of the light source pair and are lined up on a first line along an X direction; and a second group of light sources which include a second light source of the light source pair and are lined up on a second line along the X direction, a Y coordinate of the second group of light sources in a Y direction perpendicular to the X direction is different from a Y coordinate of the first group of light sources in the Y direction, wherein the first group of light sources and the second group of light sources are implemented on one substrate, and the first line and the second line are inclined with respect to the plurality of scan lines such that the first light source and the second light source of the light source pair scan a same scan line of the plurality of scan lines, and an X coordinate of a light source, which is different from the first light source, of the first group of light sources in the X direction is located between a coordinate of the first light source in the X direction and an X coordinate of the second light source in the X direction, and a distance between the first light source and the second light source of the light source pair is at least twice a distance between two adjacent light sources on the first line.

2. The scanning optical apparatus according to claim 1, wherein a distance between the first light source and the second light source of the light source pair is at least twice a distance between the Y coordinate of the first group of light sources and the Y coordinate of the second group of light sources.

3. The scanning optical apparatus according to claim 1, wherein an angle θ formed by the first and second lines with respect to the plurality of scan lines satisfies 0°<θ<45°.

4. The scanning optical apparatus according to claim 1, wherein when a scan line resolution is to be changed by rotating a substrate on which the first group of light sources and the second group of light sources are implemented with an angle θ being formed by the first line and the second line with respect to the plurality of scan lines when scanning scan lines at a first resolution and an angle θ' being formed by the first line and the second line with respect to the plurality of scan lines when scanning scan lines at a second resolution, a ratio between sin θ and sin θ' is substantially an integer and a difference Δθ between the angle θ and the angle θ' satisfies 0°<Δθ<45°.

5. An image forming apparatus comprising:

a scanning optical apparatus for simultaneously scanning a plurality of scan lines, each same scan line being scanned using a light source pair that includes at least two light sources, the scanning optical apparatus including a first group of light sources which include a first light source of the light source pair and are lined up on a first line along an X direction, and a second group of light sources which include a second light source of the light source pair and are lined up on a second line along the X direction, a Y coordinate of the second group of light sources in a Y direction perpendicular to the X direction is different from an Y coordinate of the first group of light sources in the Y direction, wherein the first group of light sources and the second group of light sources are implemented on one substrate, and the first line and the second line are inclined with respect to the plurality of scan lines such that the first light source and the second light source of the light source pair scan a same scan line of the plurality of scan lines, and an X coordinate of a light source, which is different from the first light source, of the first group of light sources in the X direction is located between a coordinate of the first light source in the X direction and an X coordinate of the second light source in the X direction, and a distance between the first light source and the second light source of the light source pair is at least twice a distance between two adjacent light sources on the first line;

an image carrier on which the latent image is formed by a light beam outputted from the plurality of light sources included in the scanning optical apparatus;

a developer apparatus which develops the latent image to form a developed image;

a transfer apparatus which transfers the developed image to a recording medium; and a fixing apparatus which fixes the developed image to the recording medium.

6. An image forming apparatus according to claim 5, wherein a distance between the first light source and the second light source of the light source pair is at least twice a distance between the Y coordinate of the first group of light sources and the Y coordinate of the second group of light sources.

7. An image forming apparatus according to claim 5, wherein an angle $\theta$ formed by the first and second lines with respect to the plurality of scan lines satisfies $0°<\theta<45°$.

8. An image forming apparatus according to claim 5, wherein when a scan line resolution is to be changed by rotating a substrate on which the first group of light sources and the second group of light sources are implemented with an angle $\theta$ being formed by the first line and the second line with respect to the plurality of scan lines when scanning scan lines at a first resolution and an angle $\theta'$ being formed by the first line and the second line with respect to the plurality of scan lines when scanning scan lines at a second resolution, a ratio between $\sin \theta$ and $\sin \theta'$ is substantially an integer and a difference $\Delta\theta$ between the angle $\theta$ and the angle $\theta'$ satisfies $0°<\Delta\theta<45°$.

9. A scanning optical apparatus for simultaneously scanning a plurality of scan lines, each same scan line being scanned using a light source pair that includes at least two light sources, the scanning optical apparatus comprising:

a first group of light sources which include a first light source of the light source pair and are lined up on a first line along an X direction; and a second group of light sources which include a second light source of the light source pair and are lined up on a second line along the X direction, a Y coordinate of the second group of light sources in a Y direction perpendicular to the X direction is different from a Y coordinate of the first group of light sources in the Y direction, wherein the first group of light sources and the second group of light sources are implemented on one substrate, and the first line and the second line are inclined with respect to the plurality of scan lines such that the first light source and the second light source of the light source pair scan a same scan line of the plurality of scan lines, and an X coordinate of a light source, which is different from the first light source, of the first group of light sources in the X direction is located between a coordinate of the first light source in the X direction and an X coordinate of the second light source in the X direction.

10. A image forming apparatus comprising:

a scanning optical apparatus for simultaneously scanning a plurality of scan lines, each same scan line being scanned using a light source pair that includes at least two light sources, the scanning optical apparatus including a first group of light sources which include a first light source of the light source pair and are lined up on a first line along an X direction, and a second group of light sources which include a second light source of the light source pair and are lined up on a second line along the X direction, a Y coordinate of the second group of light sources in a Y direction perpendicular to the X direction is different from an Y coordinate of the first group of light sources in the Y direction, wherein the first group of light sources and the second group of light sources are implemented on one substrate, and the first line and the second line are inclined with respect to the plurality of scan lines such that the first light source and the second light source of the light source pair scan a same scan line of the plurality of scan lines, and an X coordinate of a light source, which is different from the first light source, of the first group of light sources in the X direction is located between a coordinate of the first light source in the X direction and an X coordinate of the second light source in the X direction;

an image carrier on which the latent image is formed by a light beam outputted from a plurality of light sources included in the scanning optical apparatus;

a developer apparatus which develops the latent image to form a developed image;

a transfer apparatus which transfers the developed image to a recording medium; and a fixing apparatus which fixes the developed image to the recording medium.

* * * * *